United States Patent
Sugioka et al.

(10) Patent No.: US 7,411,151 B2
(45) Date of Patent: Aug. 12, 2008

(54) METHOD AND DEVICE FOR PROCESSING INSIDE OF TRANSPARENT MATERIAL

(75) Inventors: Koji Sugioka, Wako (JP); Ya Cheng, Wako (JP); Katsumi Midorikawa, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/514,649

(22) PCT Filed: May 15, 2003

(86) PCT No.: PCT/JP03/06039

§ 371 (c)(1),
(2), (4) Date: Jan. 23, 2006

(87) PCT Pub. No.: WO03/099507

PCT Pub. Date: Dec. 4, 2003

(65) Prior Publication Data

US 2006/0124618 A1    Jun. 15, 2006

(30) Foreign Application Priority Data

May 24, 2002   (JP) .............................. 2002-149931

(51) Int. Cl.
*B23K 26/06* (2006.01)
*C03C 23/00* (2006.01)

(52) U.S. Cl. ............... 219/121.73; 65/392; 219/121.68; 219/121.69; 430/321

(58) Field of Classification Search ............ 219/121.68, 219/121.69, 121.73; 65/392; 264/482; 430/321
See application file for complete search history.

(56) References Cited

U.S. PATENT DOCUMENTS 5,573,684 A * 11/1996 Winston et al. ........ 219/121.73
5,736,709 A    4/1998 Neiheisel
5,948,172 A    9/1999 Neiheisel (Continued)

FOREIGN PATENT DOCUMENTS

EP           504026 A1 *   9/1992

(Continued)

OTHER PUBLICATIONS

Kiyotaka Miura et al., Dai 42 Kai Laser Netsukako Kenkyukai Ronbunsyu, 1997, pp. 106 to 107.

(Continued)

*Primary Examiner*—Geoffrey S Evans
(74) *Attorney, Agent, or Firm*—Birch, Stewart, Kolasch & Birch, LLP

(57) ABSTRACT

A shape with a substantially perfect circle is obtained as a processed shape such as a modified shape or a worked shape at a light focus point in a cross-section in a direction parallel to an advance direction of a femtosecond laser light beam. A section in a direction perpendicular to an advance direction of a laser light beam emitted from a femtosecond laser (10) is formed in a predetermined shaped. The laser light of which sectional shape in the direction perpendicular to the advance direction is formed in the predetermined shape is entered into a lens (14). The light is focused by the lens inside a transparent material (100) and processes the inside of the transparent material.

13 Claims, 7 Drawing Sheets
(4 of 7 Drawing Sheet(s) Filed in Color)

U.S. PATENT DOCUMENTS

| | | | |
|---|---|---|---|
| 6,285,002 B1 * | 9/2001 | Ngoi et al. | 219/121.73 |
| 6,573,026 B1 * | 6/2003 | Aitken et al. | 430/321 |
| 6,977,137 B2 * | 12/2005 | Borrelli et al. | 430/321 |
| 2001/0050312 A1 | 12/2001 | Koide | |
| 2002/0033388 A1 * | 3/2002 | Okada | 219/121.73 |
| 2002/0041323 A1 | 4/2002 | Hayashi et al. | |

FOREIGN PATENT DOCUMENTS

| | | | |
|---|---|---|---|
| JP | 57-94482 A * | 6/1982 | |
| JP | 64-2790 A * | 1/1989 | |
| JP | 2-165881 A * | 6/1990 | |
| JP | 11-269683 A | 10/1999 | |
| JP | 2001-212680 A | 8/2001 | |
| JP | 2001-276985 A * | 10/2001 | |

OTHER PUBLICATIONS

Cheng et al., Riken review, Jan. 2003, No. 50, pp. 101 to 106.

* cited by examiner

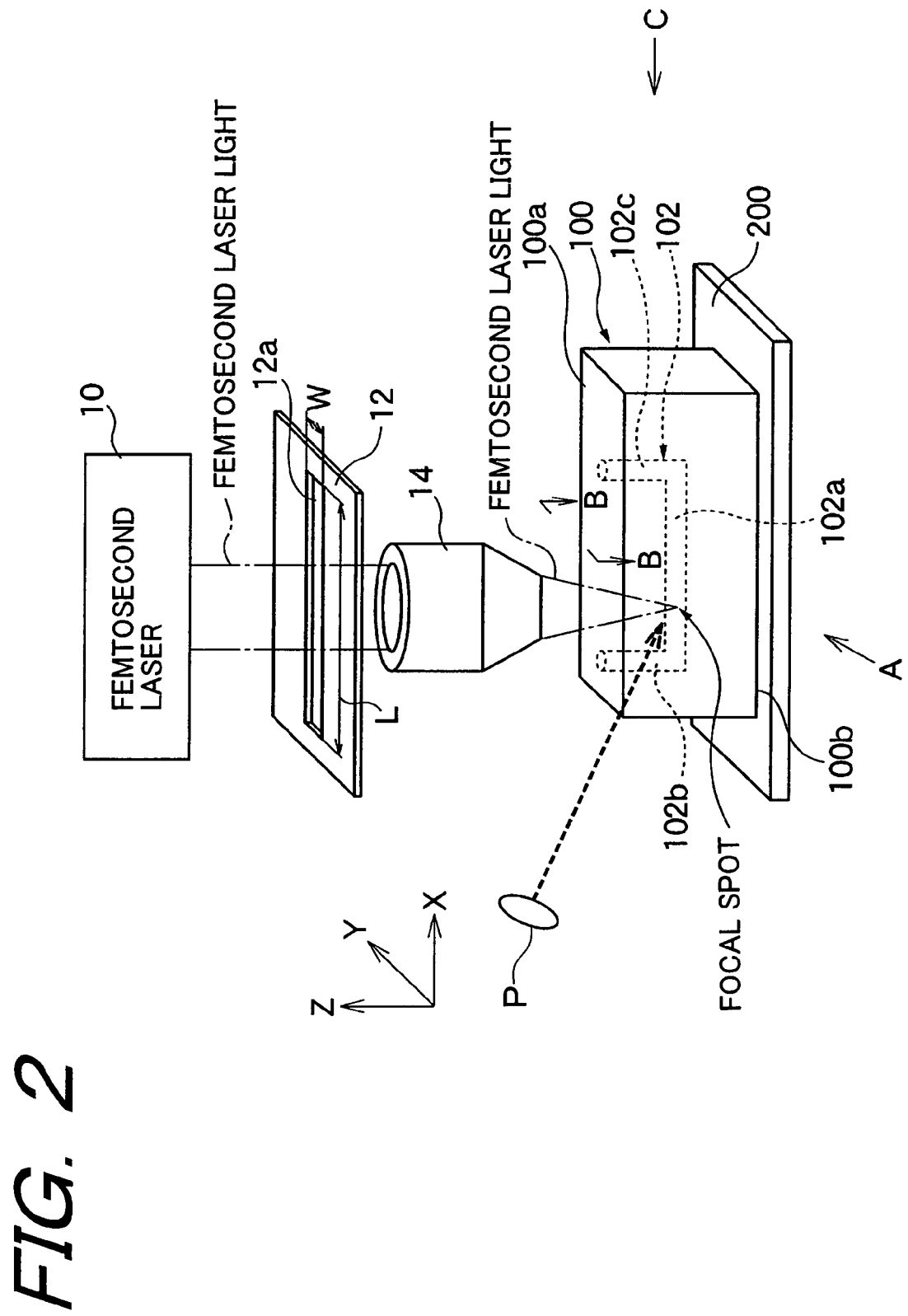

200 μm

25 μm

33 μm

50 μm

METHOD AND DEVICE FOR PROCESSING INSIDE OF TRANSPARENT MATERIAL

TECHNICAL FIELD

The present invention relates to a method and a device for processing the inside of a transparent material, more specifically to a method and a device for processing the inside of a transparent material, which is preferably used in performing processing such as modification and working of the inside of the transparent material with respect to laser light of femtosecond laser light having the pulse width of a $10^{-13}$ second order.

BACKGROUND ART

Conventionally, there has been known femtosecond laser light, which has the pulse width of a $10^{-13}$ second order as a laser light source of a sub-picosecond or less.

When femtosecond laser light being laser light that is emitted from such femtosecond laser, which is a femtosecond laser having the pulse width of about 100 to 150 femtoseconds ("laser light that is emitted from femtosecond laser" shall be referred to as "femtosecond laser light" in this specification), for example, is focused on the inside of a transparent material with respect to the femtosecond laser light (a transparent material with respect to predetermined femtosecond laser light shall be appropriately referred to simply as a "transparent material" in this specification) via a lens, there is known a phenomenon that multiphoton absorption occurs only at a focal spot being a light focus position and processing such as the modification or the working of the focal spot inside the transparent material can be performed.

In recent years, report has been made that refraction index is changed, crystal precipitation is performed, or a micro-void is generated inside a glass material that is transparent with respect to the femtosecond laser light, with the use of such phenomenon. Furthermore, report has been made regarding the fabrication of an optical waveguide, a three-dimensional memory, a photonic crystal, or a micro-channel.

Meanwhile, regarding the structure of the above-described micro-void or the like that has been fabricated using the above-described phenomenon, when observation was made for the cross-sectional shape in a direction parallel to the advance direction of the beam of femtosecond laser light, it was made clear that the cross-sectional shape greatly depended on the longitudinal direction of the femtosecond laser light at the focal spot of the femtosecond laser light, that is, the spatial intensity distribution in a direction parallel to the advance direction of the beam of femtosecond laser light.

Specifically, according to the calculation result of the inventors of this application, when the femtosecond laser light is focused using an objective lens having the numerical aperture (NA) of 0.46 ("numerical aperture=0.46" is equivalent to magnification of ×20), the spatial intensity distribution in the direction parallel to the advance direction of the beam of femtosecond laser light at the focal spot (spatial intensity distribution on a Y-Z plane in FIG. 2) should be the intensity distribution of a lengthwise elliptical shape extending in the advance direction of the beam of femtosecond laser light, as shown in FIG. 1(a).

As a result, the processed shape such as a modified shape and a worked shape inside the transparent material became the lengthwise elliptical shape extending in the advance direction of the beam of femtosecond laser light by suffering from the spatial intensity distribution in the direction parallel to the advance direction of the beam of femtosecond laser light at the focal spot inside the transparent material.

However, there existed a problem that it was not desirable that the processed shape such as a modified shape and a worked shape inside the transparent material became the lengthwise elliptical shape extending in the advance direction of the beam of femtosecond laser light when industrial fabrication and usage of micro-channel or optical waveguide are taken in consideration. Specifically, as the processed shape such as a modified shape and a worked shape inside the transparent material, a shape whose cross-sectional shape in the direction parallel to the advance direction of the beam of femtosecond laser light is a substantially perfect circle was required.

Herein, in order to obtain a shape whose cross-sectional shape in the direction parallel to the advance direction of the beam of femtosecond laser light is a substantially perfect circle as the processed shape such as a modified shape and a worked shape inside the transparent material, the spatial intensity distribution in the direction parallel to the advance direction of the beam of femtosecond laser light should be a shape of a substantially perfect circle.

Generally, as a method of obtaining a shape whose cross-sectional shape in the direction parallel to the advance direction of the beam of femtosecond laser light is a substantially perfect circle as the processed shape such as a modified shape and a worked shape inside the transparent material while obtaining the spatial intensity distribution of a substantially perfect circle in the direction parallel to the advance direction of the beam of femtosecond laser light, the use of an objective lens having a large numerical aperture is considered.

Certainly, when the femtosecond laser light is focused on the inside of the transparent material using an objective lens having the numerical aperture of 1 or more and the processing such as the modification and working inside the transparent material is performed, there is known that a shape whose cross-sectional shape in the direction parallel to the advance direction of the beam of femtosecond laser light is the shape of substantially perfect circle is obtained as the processed shape such as a modified shape and a worked shape on the focal spot (Hiroaki MISAWA et al., Proc. SPIE Vol. 4088, p 29-32).

However, when the femtosecond laser light is focused on the inside of the transparent material using the objective lens having the numerical aperture of 1 or more, a working distance (the working distance is the distance between the objective lens and a sample that is the transparent material to be modified or worked) becomes several hundred µm or less (the working distance is 200 to 300 µm when the femtosecond laser light is focused on the inside of the transparent material using an objective lens having the numerical aperture of 1), so that a problem was pointed out that the processing such as the modification and the working with respect to a region at a deep position inside the transparent material was impossible.

The present invention has been created in view of the above-described problems that prior art has, and it is an object of the present invention to provide a method and a device for processing the inside of a transparent material, which is capable of obtaining a cross-sectional shape in a direction parallel to the advance direction of the beam of femtosecond laser light is a substantially perfect circle as the processed shape such as a modified shape or a worked shape on a light focus position being a light focus position, even if the femtosecond laser light is focused on the inside of the transparent material using a condenser lens of a relatively small numerical aperture, by which the working distance of several mm or more can be secured.

DISCLOSURE OF THE INVENTION

To achieve the above-described object, the present invention is a method in which a beam shape of a cross-section in a direction perpendicular to the advance direction of laser light beam, which has emitted from a femtosecond laser, is shaped in a predetermined shape, laser light whose beam shape of the cross-section in the direction perpendicular to the advance direction is shaped in the predetermined shape is allowed to enter a lens and the light is focused on the inside of a transparent material by the lens, and the inside of the transparent material is processed by the operation of the laser light that is focused on the inside of the transparent material.

Further, the present invention is a method in which the predetermined shape is an approximately rectangular shape.

Further, the present invention is a method in which the predetermined shape is an approximately cross shape.

Furthermore, the present invention is a device that has a femtosecond laser that emits laser light, beam shape shaping means that shapes the beam shape of a cross-section in the direction perpendicular to the advance direction of laser light beam, which is emitted from the femtosecond laser, in a predetermined shape, and a lens into which the laser light, whose beam shape of the cross-section in the direction perpendicular to the advance direction has been shaped in the predetermined shape by the beam shape shaping means, is allowed to enter and which focuses the laser light on the inside of the transparent material, in which the inside of the transparent material is processed by the operation of the laser light that has been focused on the inside of the transparent material by the lens.

In addition, the present invention is a device that further has moving means that relatively moves the light focus position of laser light, which is focused on the inside of the transparent material, with respect to the transparent material.

In addition, the present invention is a device in which the beam shape shaping means includes a slit of an approximately rectangular shape through which laser light emitted from the femtosecond laser light passes, and shapes the beam shape of the cross-section in the direction perpendicular to the advance direction of the laser light beam, which has been emitted from the femtosecond laser, in an approximately rectangular shape.

Further, the present invention is a device in which the beam shape shaping means includes a slit of an approximately cross shape through which laser light emitted from the femtosecond laser light passes, and shapes the beam shape of the cross-section in the direction perpendicular to the advance direction of the laser light beam, which has been emitted from the femtosecond laser, in an approximately cross shape.

Still further, the present invention is a device in which the beam shape shaping means is means where the first cylindrical lens and the second cylindrical lens are sequentially arranged in parallel, and shapes the beam shape of the cross-section in the direction perpendicular to the advance direction of the laser light beam, which has been emitted from the femtosecond laser, in an approximately rectangular shape.

Therefore, according to the above-described present invention, the spatial intensity distribution in the direction parallel to the advance direction of the beam of femtosecond laser light at the focal spot inside the transparent material is a substantially perfect circle, and consequently, a shape whose cross-sectional shape in the direction parallel to the advance direction of the beam of femtosecond laser light is a substantially perfect circle can be obtained.

Specifically, when the beam shape of the cross-section in the direction perpendicular to the advance direction of the laser light beam emitted from the femtosecond laser is shaped in the predetermined shape, which is an approximately rectangular shape or an approximately cross shape, for example, and entered into the lens, the spatial intensity distribution in the direction parallel to the advance direction of the beam of femtosecond laser light at the focal spot inside the transparent material becomes a substantially perfect circle due to diffraction effect. Accordingly, a shape whose cross-sectional shape in the direction parallel to the advance direction of the beam of femtosecond laser light is a substantially perfect circle can be obtained as the processed shape such as a modified shape and a worked shape on the inside of the transparent material.

BRIEF DESCRIPTION OF THE DRAWINGS

The patent or application file contains at least one drawing executed in color. Copies of this patent or patent application publication with color drawing(s) will be provided by the office upon request and payment of the necessary fee.

FIG. 1(*b*) is a photograph showing a simulation view that shows a calculation result of the spatial intensity distribution in the direction parallel to the advance direction of the beam of femtosecond laser light on the focal spot when femtosecond laser light is focused by using the processing device for the inside of a transparent material according to the present invention (the objective lens having the numerical aperture of 0.46 is used as an objective lens. In addition, the shape of a beam entered into the objective lens is "0.5 mm×3 mm".).

Figure 1A:
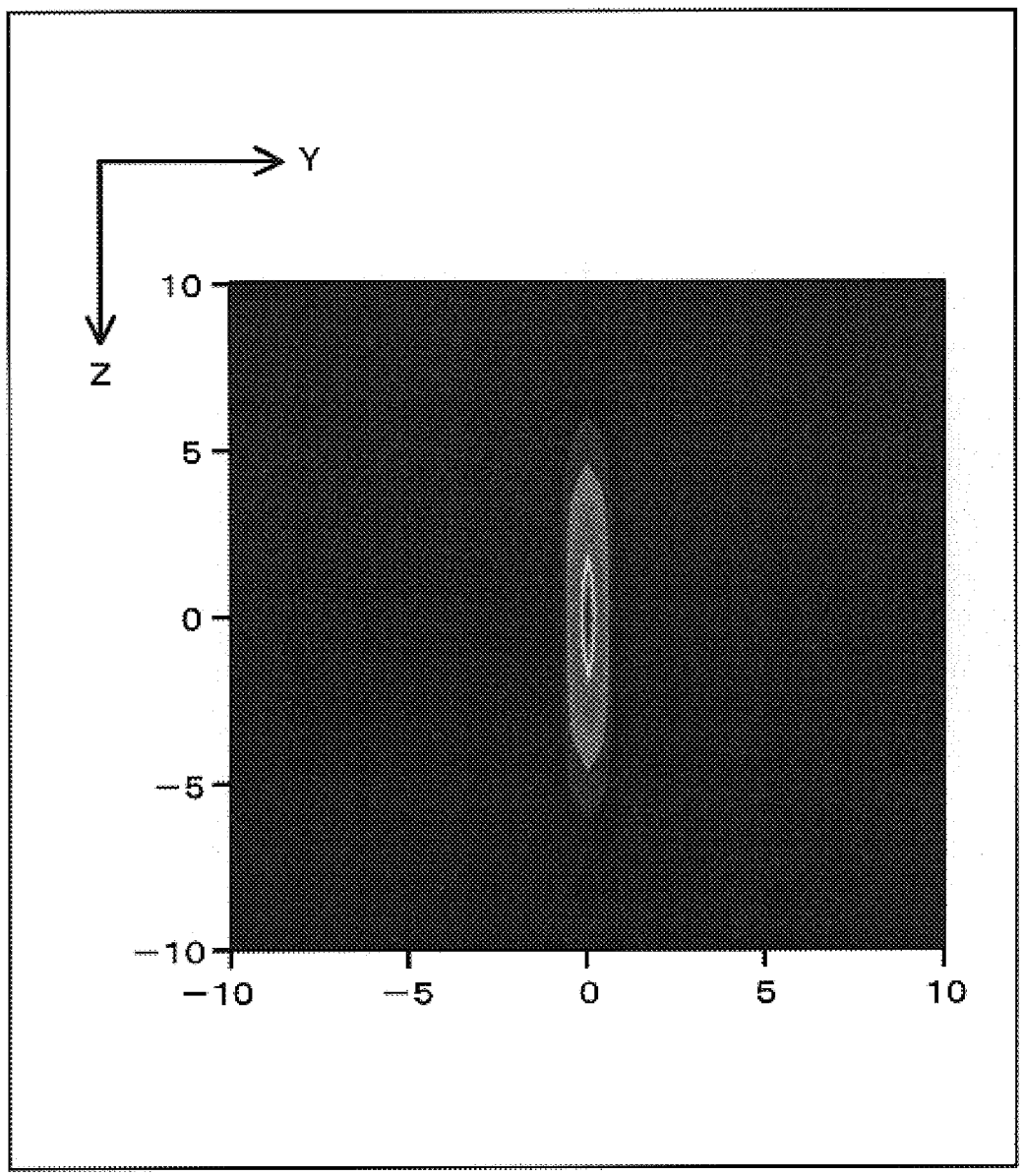
FIG. 1(*a*) is a photograph showing a simulation view that shows a calculation result of the spatial intensity distribution in the direction parallel to the advance direction of the beam of femtosecond laser light on the focal spot when the femtosecond laser light is focused by using an objective lens having the numerical aperture of 0.46.

It is to be noted that the intensity becomes higher toward the center of the simulation view of FIG. 1(*a*) and FIG. 1(*b*).

FIG. 2 is a conceptual constitution exemplary view of a processing device for the inside of a transparent material.

FIG. 3(*a*), FIG. 3(*b*), FIG. 3(*c*), and FIG. 3(*d*) are micrographs of a micro-channel that has been experimentally fabricated by the inventors of this application. It is to be noted that FIG. 3(*a*) and FIG. 3(*b*) show a conventional case where the femtosecond laser light was directly focused by the objective lens and irradiated on the inside of a sample without using a slit member, and FIG. 3(*c*) and FIG. 3(*d*) show a case of the present invention where the femtosecond laser light was focused by the objective lens and irradiated on the inside of the sample after the light was allowed to pass through an approximately rectangular slit by using the slit member.

Further, FIG. 3(*a*) and FIG. 3(*c*) show results in which observation was made from the side surface of the sample, that is, from arrow A in FIG. 2, and FIG. 3(*b*) and FIG. 3(*d*) shows results in which the sample was mechanically cut off along B-B line in FIG. 2 from the top surface to the bottom surface and observation was made to a cross-section of a micro-channel, which is formed on the inside of the sample, in the direction perpendicular to the scanning direction of the beam of femtosecond laser light from arrow C.

FIG. 4(*a*) and FIG. 4(*b*) are micrographs of the micro-channel that has been experimentally fabricated by the inventors of this application. FIG. 4(*a*) shows a result in which observation was made from the side surface of the sample, that is, from arrow A in FIG. 2, and FIG. 4(*b*) shows a result in which the sample was mechanically cut off along B-B line in FIG. 2 from the top surface to the bottom surface and observation was made to a cross-section of a micro-channel, which is formed on the inside of the sample, in the direction perpendicular to the scanning direction of the beam of femtosecond laser light from arrow C.

Figure 5:
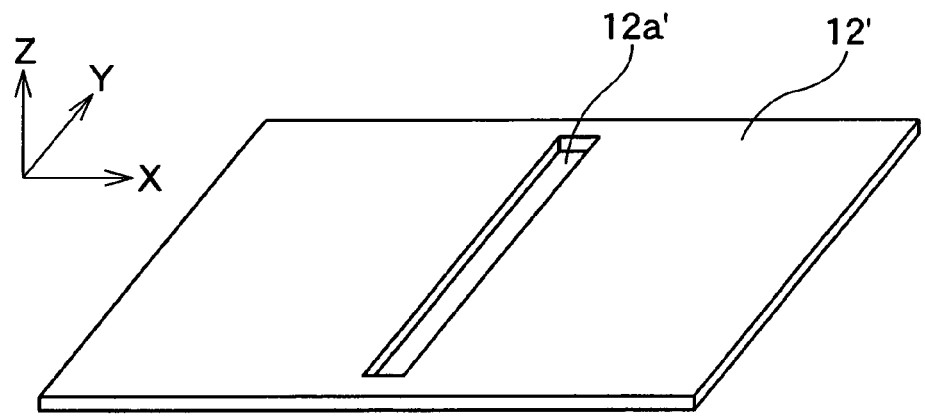
Figure 5:
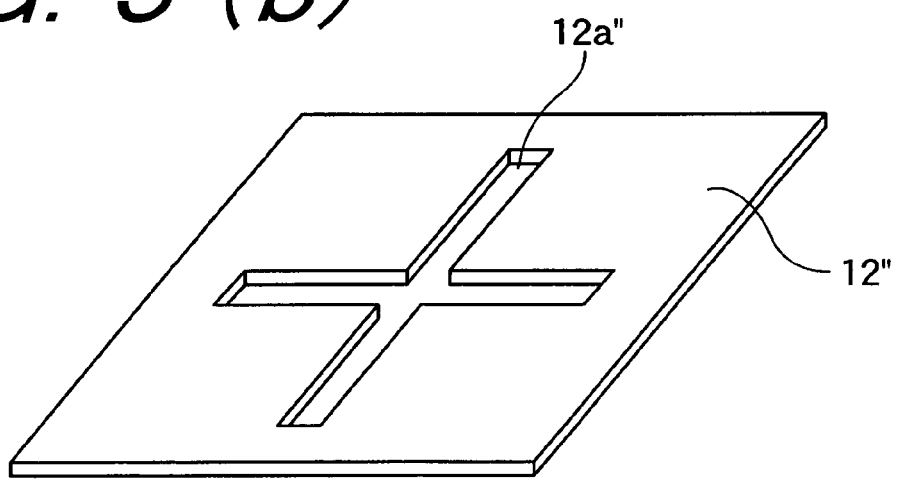

FIG. 5(a) and FIG. 5(b) are exemplary views showing other constitution examples of the slit member.

Figure 6:
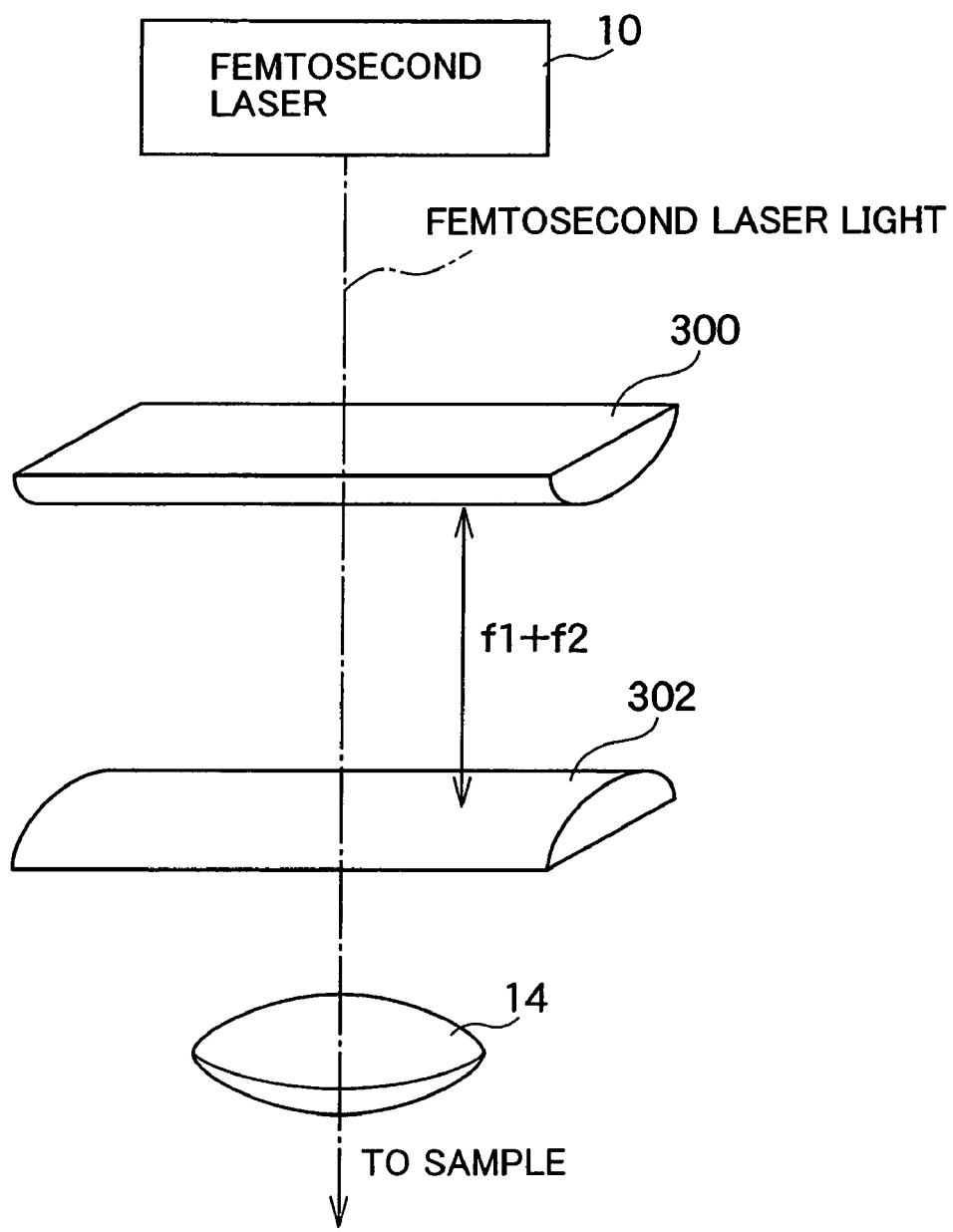

FIG. 6 is an exemplary view showing a constitution example of beam shape shaping means that is different from the slit member.

EXPLANATION OF REFERENCE NUMERALS

10 Femtosecond laser
12, 12', 12" Slit member
12a, 12a', 12a" Slit
14 Objective lens
100 Sample
100a Top surface
100b Bottom surface
102 Micro-channel
102a, 102b, 102c Flow path
200 Moving table
300 First cylindrical lens
302 Second cylindrical lens
P Shape of focal spot of femtosecond laser light on X-Y plane in FIG. 2

BEST MODE FOR CARRYING OUT THE INVENTION

In the following, description will be made for one example of the embodiment of the method and the device for processing the inside of a transparent material according to the present invention based on the accompanying drawings.

FIG. 2 shows the conceptual constitution exemplary view of the processing device for the inside of a transparent material according to the present invention. In FIG. 2, as processing inside a sample 100, which is made of photosensitive glass as the transparent material, while the processing device of the inside of the transparent material according to the present invention is used, a case is shown for performing modification of a region that becomes a micro-channel 102 in order to form the micro-channel 102 inside the sample 100. It is to be noted that Forturan glass can be used as the photosensitive glass, for example.

The processing device for the inside of a transparent material shown in FIG. 2 is constituted by having a femtosecond laser 10 that irradiates femtosecond laser light having the pulse width of about 100 to 150 femtoseconds, for example, as the femtosecond laser light having the pulse width of a $10^{-13}$ second order, a slit member 12 on which an approximately rectangular slit 12a is formed, through which the femtosecond laser light emitted from the femtosecond laser 10 passes, as the beam shape shaping means that shapes the beam shape of the cross-section in the direction perpendicular to the advance direction of laser light beam, which is emitted from the femtosecond laser 10, in a predetermined shape, and an objective lens 14 as a lens that focuses the femtosecond laser light, which has passed through the slit 12a of the slit member 12, on the inside of the sample 100.

Further, the processing device for the inside of a transparent material is provided with a moving table 200 as moving means that relatively moves the light focus position of the femtosecond laser light, which is focused on the inside of the sample 100 by the objective lens 14, with respect to the sample 100, and the sample 100 is mounted on the moving table 200. It is to be noted that the moving table 200 is designed to be movable arbitrarily in X-direction, Y-direction and Z-direction in FIG. 2, and such movement is controlled by drive means (not shown) such as a motor.

Specifically, the processing device for the inside of a transparent material is aligned and fixed with respect to the sample 100, but is constituted such that the light focus position of the femtosecond laser light, which is focused on the inside of the sample 100, is arbitrarily moved in X-direction, Y-direction and Z-direction with respect to the sample 100 by arbitrarily moving the sample 100 in X-direction, Y-direction and Z-direction after mounting the sample on the moving table 200, and the femtosecond laser light is enabled to scan arbitrarily in X-direction, Y-direction and Z-direction inside the sample 100.

Herein, the approximately rectangular slit 12a formed on the slit member 12 is formed so as to extend in X-direction where femtosecond laser light is allowed to scan relatively with respect to the sample 100, and its length L in a longitudinal direction is 3 mm, for example, and length W in a width direction is 0.5 mm, for example.

Further, in the processing device for the inside of a transparent material, a lens having the numerical aperture of 0.46 (magnification: ×20), for example, can be used as the objective lens 14.

In the above-described construction, femtosecond laser light emitted from the femtosecond laser 10 passes through the slit 12a of the slit member 12, and is allowed to enter the objective lens 14 with a beam shape same as the shape of the slit 12a. Specifically, the beam shape of the cross-section in the direction perpendicular to the advance direction of the beam of femtosecond laser light, which is emitted from the femtosecond laser 10, is shaped in an approximately rectangular shape when the femtosecond laser light passes through the slit 12a of the slit member 12, and femtosecond laser light, whose beam shape of the cross-section in the direction perpendicular to the advance direction of the beam is shaped in an approximately rectangular shape, is allowed to enter the objective lens 14.

Then, the femtosecond laser light that has entered into the objective lens 14, which is femtosecond laser light whose beam shape of the cross-section in the direction perpendicular to the advance direction of the beam is shaped in an approximately rectangular shape same as the shape of the slit 12a, is focused by the objective lens 14, and focused on the focal spot being the light focus position located inside the sample 100.

Figure 1B:
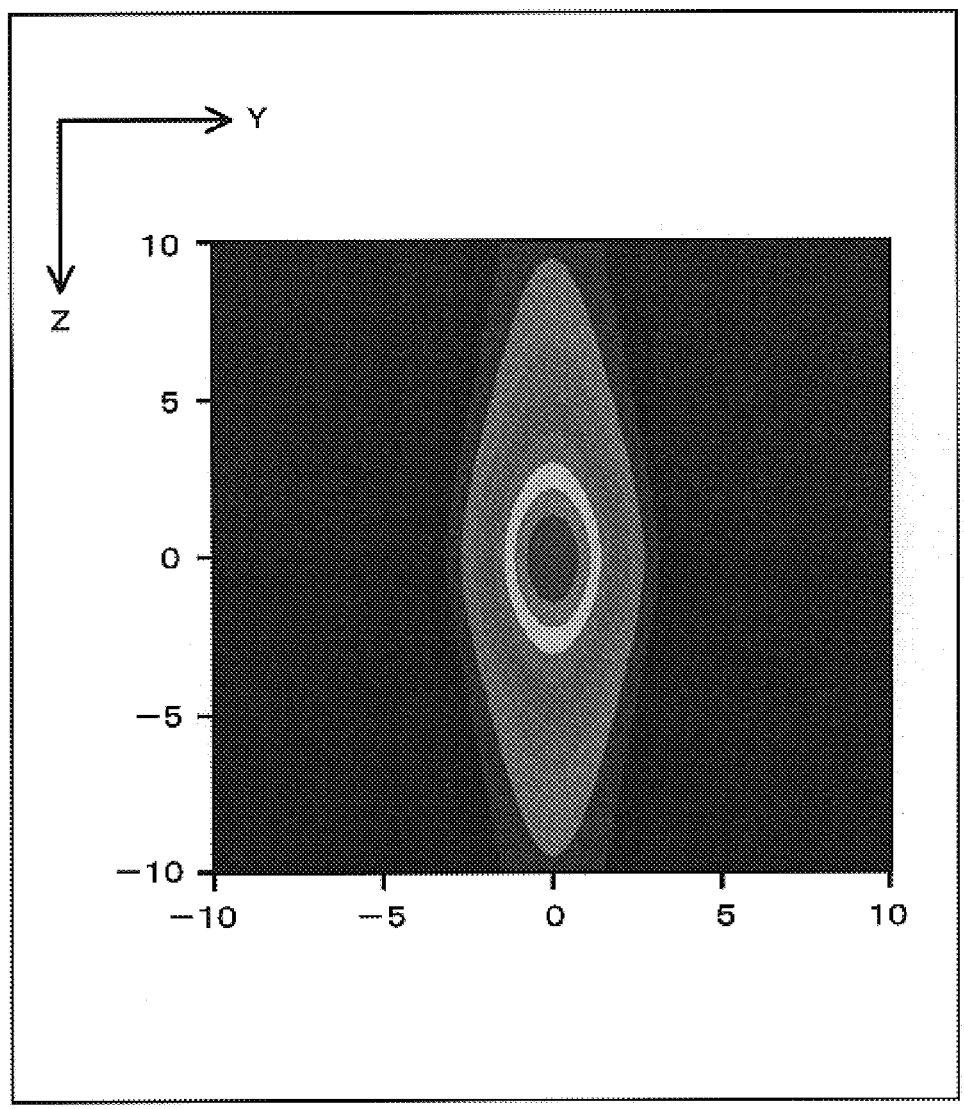

As described above, by focusing the femtosecond laser light by the objective lens 14 after allowing it pass through the slit 12a, the spatial intensity distribution in the direction parallel to the advance direction of the beam of femtosecond laser light at the focal spot (the spatial intensity distribution on Y-Z plane in FIG. 2) is improved significantly according to the calculation result of the inventors of this application, and the spatial intensity distribution of a substantially perfect circle is obtained at the central portion of the focal spot as shown in FIG. 1(b)

It is to be noted that reference code P in FIG. 2 shows the shape of the focal spot of femtosecond laser light on X-Y plane in FIG. 2.

Herein, the reason why the spatial intensity distribution was improved by the processing device for the inside of a transparent material according to the present invention is because the beam shape of femtosecond laser light was shaped in a long beam shape with respect to X-direction by the slit 12a, the diffraction effect occurred in this direction, and the beam spread in Y-direction at the point where the beam was focused by the objective lens 14 (the beam shape of femtosecond laser light at the focal spot matches the beam shape of femtosecond laser light that entered the objective lens 14, to which Fourier transformation was performed).

Therefore, although the beam width in Y-direction increases when the beam shape of femtosecond laser light is shaped long with respect to X-direction, a region to be processed by femtosecond laser light can be limited narrower since the spatial intensity at the central area of the light focus position is considerably weaker comparing to the case where the beam was not shaped.

Accordingly, the width of a formed micro-channel is narrower when the beam was shaped despite that the beam width increased in Y-direction as shown in FIGS. 3 and 4.

Further, as shown in FIG. 5(a), when a direction where the slit (shown by reference numeral 12a' in FIG. 5(a)) is positioned is rotated by 90 degrees from the direction of the slit 12a shown in FIG. 2 to shape the beam in a long beam shape in Y-direction, a long beam shape in X-direction being a beam scanning direction is formed at the light focus position of femtosecond laser light, so that an even narrower channel can be fabricated.

Next, description will be made for the experiment results by the inventors of this application, which was conducted using the processing device for the inside of a transparent material.

It is to be noted that, in the processing device for the inside of a transparent material used in the experiment, the size of the approximately rectangular slit 12a that was formed on the slit member 12 was set to 3 mm as the length L in the longitudinal direction (refer to FIG. 2) and 0.5 mm as the length W in the width direction (refer to FIG. 2). Further, the lens having the numerical aperture of 0.46 (magnification: ×20) was used as the objective lens 14. Moreover, light of "energy=490 nJ" was used as the femtosecond laser light to be emitted from the femtosecond laser 10. Then, speed of the femtosecond laser light focused on the inside of the sample 100 when it is allowed to scan the inside of the sample 100 was set to "speed=250 µm".

The experiment is for forming the micro-channel 102 inside the sample 100 made of photosensitive glass by using the processing device for the inside of a transparent material. Firstly, femtosecond laser light is focused on the inside of the sample 100, the sample 100 mounted on the moving table 200 is moved in X-direction by moving the moving table 200 in X-direction, and a flow path 102a of the micro-channel 102 is modified by scanning the femtosecond laser light in X-direction relatively with respect to the sample 100.

Subsequently, after the focal spot of the femtosecond laser light is positioned at one end portion of the flow path 102a, which has been modified by scanning the femtosecond laser light in X-direction, the sample 100 mounted on the moving table is moved in Z-direction by moving the moving table 200 in Z-direction, and a flow path 102b of the micro-channel 102 is modified by scanning the femtosecond laser light in Z-direction relatively with respect to the sample 100. It is to be noted that the sample 100 is moved in Z-direction such that the focal spot of the femtosecond laser light is allowed to scan to the top surface 100a of the sample 100 in such occasion.

Similarly, after the focal spot of the femtosecond laser light is positioned at the other end portion of the flow path 102a, which has been modified by scanning the femtosecond laser light in X-direction, the sample 100 mounted on the moving table 200 is moved in Z-direction by moving the moving table 200 in Z-direction, and a flow path 102c of the micro-channel 102 is modified by scanning the femtosecond laser light in Z-direction relatively with respect to the sample 100. It is to be noted that the sample 100 is moved in Z-direction such that the focal spot of the femtosecond laser light is allowed to scan to the top surface 100a of the sample 100 in such occasion.

When thermal processing is performed after the femtosecond laser light was irradiated on the sample 100 as described above, a region to which the femtosecond laser light was irradiated has etching rate on hydrofluoric acid solution several tens times to a region to which the femtosecond laser light was not irradiated. It is possible to selectively etch only the region to which the femtosecond laser light was irradiated by utilizing the difference of etching rate, and the micro-channel 102 was formed in a penetrated manner.

Figure 3A:
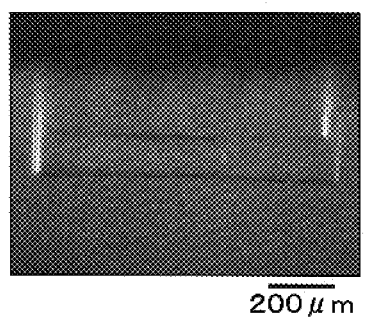

FIGS. 3(a), (b), (c) and (d) show the micrographs of the micro-channel 102 that was formed in the sample 100 as described above. It is to be noted that FIGS. 3(a) and (b) show the conventional case where the femtosecond laser light was directly focused by the objective lens 14 and irradiated on the inside of the sample 100 without using the slit member 12, and FIGS. 3(c) and (d) show the case of the present invention where the femtosecond laser light was focused by the objective lens 14 and irradiated on the inside of the sample 100 after the light was allowed to pass through the approximately rectangular slit 12a by using the slit member 12.

Figure 3B:
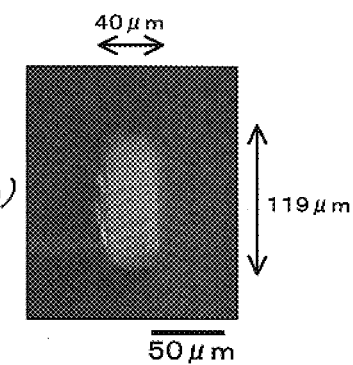
Figure 3C:
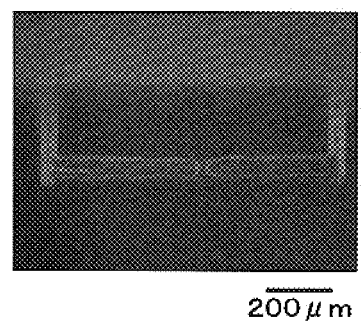

Furthermore, FIGS. 3(a) and (c) show the results in which observation was made from the side surface of the sample 100, that is, from arrow A in FIG. 2, and FIGS. 3(b) and (d) show the results in which the sample 100 was mechanically cut off along B-B line in FIG. 2 from the top surface 100a to the bottom surface 100b and observation was made to the cross-section of the micro-channel 102, which was formed on the inside of the sample 100, in the direction perpendicular to the scanning direction of the beam of femtosecond laser light from arrow C.

Figure 3D:
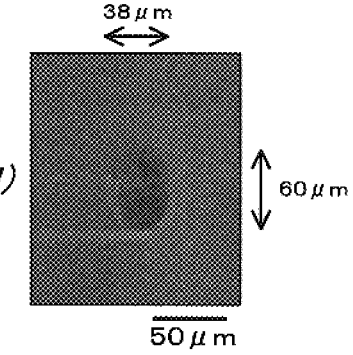

As shown in FIGS. 3(a), (b), (c) and (d), the length of the cross-sectional shape of the micro-channel 102 in a horizontal direction (width direction) is 40 µm for the one shown in FIG. 3(b) and 38 µm for the one shown in FIG. 3(d), where the length when the slit 12 was used is slightly narrower.

Moreover, the length of the cross-sectional shape of the micro-channel 102 in a vertical direction (height direction) is 119 µm for the one shown in FIG. 3(b) and 60 µm for the one shown in FIG. 3(d), where a large difference is between the both. Consequently, the aspect ratio that is the ratio of lengths in the vertical direction and the horizontal direction of the cross-sectional shape of the micro-channel 102 is "3" for the one shown in FIG. 3(b) and "1.6" for the one shown in FIG. 3(d), and thus the aspect ratio was improved significantly from "3" to "1.6" by allowing the femtosecond laser light to pass through the slit 12a.

Figure 4A:
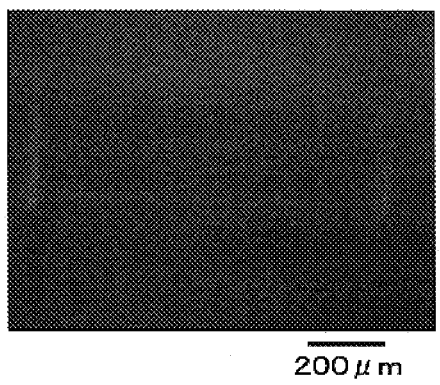
Figure 4B:
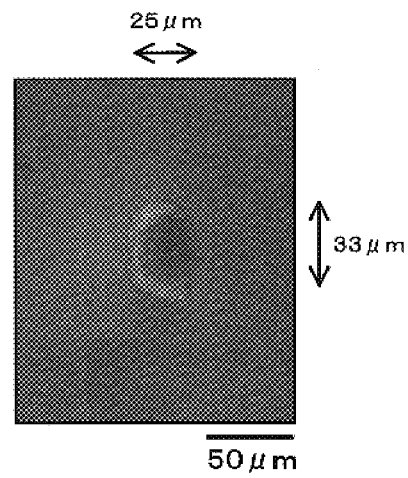

FIGS. 4(a) and (b) show the results of experiment that was conducted under the completely same conditions as the experiment shown in FIG. 3 except that the size of the approximately rectangular slit 12a formed on the slit member 12 was set to 3 mm for the length L in the longitudinal direction and 0.2 mm for the length W in the width direction. It is to be noted that FIG. 4(a) shows the result in which observation was made from the side surface of the sample 100, that is, from arrow A in FIG. 2, and FIG. 4(b) shows the result in which the sample 100 was mechanically cut off along B-B line in FIG. 2 from the top surface 100a to the bottom surface 100b and observation was made to the cross-section of the micro-channel 102, which is formed on the inside of the sample 100, in the direction perpendicular to the traveling direction of the beam of femtosecond laser light from arrow C.

According to the experimental results shown in FIGS. 4(a) and (b), by setting the length in the width direction of the approximately rectangular slit 12a to 0.2 mm, the length in the horizontal direction of the cross-sectional shape of the micro-channel 102 became 25 μm, the length in the vertical direction of the cross-sectional shape of the micro-channel 102 became 33 μm, and the aspect ratio was further improved to "1.3".

Therefore, when the length in the width direction W of the approximately rectangular slit 12a is made shorter, the aspect ratio is improved and the cross-sectional shape of the micro-channel 102 becomes a substantially perfect circle.

It is to be noted that the above-described embodiments may be modified as shown in the following (1) to (5).

(1) In the above-described embodiments, as the beam shape shaping means that shapes the beam shape of a cross-section in a direction perpendicular to the advance direction of laser light beam, which is emitted from a femtosecond laser, in a predetermined shape, the slit member 12 was used, where the approximately rectangular slit 12a, through which the femtosecond laser light emitted from the femtosecond laser 10 passes, was formed along the X-direction in FIG. 2 out of the scanning directions of the femtosecond laser light. However, it goes without saying that the invention is not limited to this.

For example, a slit member 12' (refer to FIG. 5(a)) may be used, where an approximately rectangular slit 12a, through which the femtosecond laser light emitted from the femtosecond laser 10 passes, is formed along the Y-direction perpendicular to the X-direction in FIG. 2 out of the scanning directions of the femtosecond laser light.

Alternatively, as the slit through which the femtosecond laser light emitted from the femtosecond laser 10 passes, a slit member 12 (refer to FIG. 5(b)) on which a cross-shaped slit 12a″ is formed may be used.

Furthermore, an appropriate shape can be selected as the shape of the slit through which the femtosecond laser light emitted from the femtosecond laser 10 passes, and the arrangement position when arranging the slit with respect to the femtosecond laser light emitted from the femtosecond laser 10 can be appropriately selected.

Herein, in the case of using the slit as shown in FIG. 5(a), a narrower micro-channel can be formed as described above.

Further, in the case of using the slit as shown in FIG. 5(b), the intensity distribution of a perfect sphere (circular in all direction) instead of a perfect circle (circular only in one direction) is obtained. Therefore, by using the slit as shown in FIG. 5(b), the invention can be also applied not only for the fabrication of the micro-channel and the optical waveguide but also the micro-void, the three-dimensional memory, and the photonic crystal.

(2) In the above-described embodiments, as the beam shape shaping means that shapes the beam shape of a cross-section in a direction perpendicular to the advance direction of laser light beam, which is emitted from a femtosecond laser, in a predetermined shape, the slit member 12 was used, where the approximately rectangular slit 12a, through which the femtosecond laser light emitted from the femtosecond laser 10 passes, was formed along the scanning direction of the femtosecond laser light. However, it goes without saying that the invention is not limited to this.

Specifically, there is a fear that a large quantity of energy will be lost when shaping the beam shape of a cross-section in a direction perpendicular to the advance direction of laser light beam, which is emitted from a femtosecond laser 10, in a predetermined shape by using the slit member 12. To eliminate the fear of energy loss, the first cylindrical lens 300 having the focal distance of f1 and the second cylindrical lens 302 having the focal distance of f2 should be sequentially arranged between the femtosecond laser 10 and the objective lens 14 such that the lenses become perpendicular to the advance direction of the beam of femtosecond laser light emitted from the femtosecond laser 10 and extend parallelly with each other and in a same direction. In such occasion, the distance between the first cylindrical lens 300 and the second cylindrical lens 302 shall be "f1+f2".

With the construction as above, the beam shape of a cross-section in a direction perpendicular to the advance direction of laser light beam, which was emitted from the femtosecond laser 10 and sequentially made incident to the first cylindrical lens 300 and the second cylindrical lens 302, becomes an approximately rectangular shape when it is emitted from the second cylindrical lens, and the femtosecond laser light, where the beam shape of a cross-section in a direction perpendicular to the advance direction of the beam is shaped in the approximately rectangular shape, enters the objective lens 14 and focused.

Therefore, when the beam shape of a cross-section in a direction perpendicular to the advance direction of the beam of femtosecond laser light is shaped by using the two cylindrical lenses as described above, for example, loss is almost eliminated and a beam shape of the same approximately rectangular shape as the case where the slit member 12 on which the slit 12a was formed can be obtained.

(3) In the above-described embodiments, the moving table 200 moved the sample 100 to relatively move the focal spot of femtosecond laser light with respect to the sample 100. However, it goes without saying that the invention is not limited to this.

Specifically, on the contrary to the above-described embodiments, the processing device for the inside of a transparent material is constituted to move with respect to the sample 100, and the constitution may be in such a manner that the focal spot of femtosecond laser light on the inside of the sample 100 is allowed to scan by moving the processing device for the inside of a transparent material.

(4) In the above-described embodiments, description was made for fabricating the micro-channel, but it goes without saying that the invention is not limited to this. The present invention can be applied for the fabrication of other structures such as the optical waveguide and the three-dimensional memory.

(5) The above-described embodiments and the modifications shown in the above-described (1) to (4) may be used in combination appropriately.

INDUSTRIAL APPLICABILITY

Since the present invention is constituted as described above, it exerts superior effect that a shape, whose cross-sectional shape in a direction parallel to the advance direction of the beam of femtosecond laser light, is a substantially perfect circle can be obtained as the processed shape such as a modified shape and a worked shape even if femtosecond laser light is focused on the inside of a transparent material by using a condenser lens having relatively small numerical aperture by which working distance of several mm or more can be secured.

What is claimed is:

1. A method of processing the inside of a transparent material, comprising the steps of:
   shaping a beam shape of a cross-section in a direction orthogonal to a beam advance direction of a femtosecond laser light in an approximately rectangular shape by passing said femtosecond laser light through a slit of the approximately rectangular shape;

allowing the femtosecond laser light, whose beam shape of the cross-section in the direction orthogonal to said advance direction is shaped in the approximately rectangular shape, to enter a condenser lens and focusing the light so that a spatial intensity distribution in a direction parallel to the beam advance direction of the femtosecond laser light has a shape of a substantially perfect circle at a focal spot inside said transparent material by said condenser lens; and processing the inside of said transparent material by the operation at a focal spot of the femtosecond laser light focused inside said transparent material by said condenser lens.

2. The method according to claim 1, wherein a diffraction effect occurs with respect to a long direction of the approximately rectangularly shaped slit.

3. A method of processing the inside of a transparent material, comprising the steps of:

shaping a beam shape of a cross-section in a direction orthogonal to a beam advance direction of a femtosecond laser light into an approximately rectangular shape extending in a scanning direction by passing said femtosecond laser light, which is relatively scanned with respect to a transparent material, through a slit of the approximately rectangular shape that has been formed extending in said scanning direction;

allowing the femtosecond laser light, whose beam shape of the cross-section in the direction orthogonal to said advance direction is shaped in the approximately rectangular shape extending in said scanning direction, to enter a condenser lens and focusing the light so that a spatial intensity distribution in a direction parallel to the beam advance direction of the femtosecond laser light has a shape of a substantially perfect circle at a focal spot inside said transparent material by said condenser lens; and processing the inside of said transparent material by the operation at a focal spot of the femtosecond laser light focused inside said transparent material by said condenser lens.

4. A method of processing the inside of a transparent material, comprising the steps of:

shaping a beam shape of a cross-section in a direction orthogonal to a beam advance direction of a femtosecond laser light into an approximately rectangular shape extending in a direction orthogonal to a scanning direction by passing said femtosecond laser light, which is relatively scanned with respect to a transparent material, through a slit of an approximately rectangular shape that has been formed extending in a direction orthogonal to said scanning direction;

allowing the femtosecond laser light, whose beam shape of the cross-section in the direction orthogonal to said advance direction is shaped in the approximately rectangular shape extending in the direction orthogonal to said scanning direction, to enter a condenser lens and focusing the light so that a spatial intensity distribution in a direction parallel to the beam advance direction of the femtosecond laser light has a shape of a substantially perfect circle at a focal spot inside said transparent material by said condenser lens; and processing the inside of said transparent material by the operation at a focal spot of the femtosecond laser light focused inside said transparent material by said condenser lens.

5. A method of processing the inside of a transparent material, comprising the steps of:

shaping a beam shape of a cross-section in a direction orthogonal to a beam advance direction of a femtosecond laser light in the cross shape by passing said femtosecond laser light through a cross shaped slit;

allowing the femtosecond laser light, whose beam shape of the cross-section in the direction orthogonal to said advance direction is shaped in the cross shape, to enter a lens and focusing the light inside said transparent material by said lens; and processing the inside of said transparent material by the operation of the femtosecond laser light focused inside said transparent material.

6. The method according to claim 5, wherein a diffraction effect occurs with respect to a long direction of the approximately cross shaped slit so that a spatial intensity distribution in a direction parallel with the beam advance direction of the laser at the focusing point becomes closer to completely round.

7. A device of processing the inside of a transparent material, comprising:

a femtosecond laser that emits laser light;

beam shape shaping means that includes a slit having an approximately rectangular shape through which the laser light emitted from said femtosecond laser passes and shapes the beam shape of a cross-section in a direction orthogonal to the beam advance direction of the laser light emitted from said femtosecond laser into an approximately rectangular shape; and a condenser lens into which the laser light, whose beam shape of the cross-section in the direction orthogonal to said advance direction is shaped into the approximately rectangular shape by said beam shape shaping means, enters and which focuses the laser light so that a spatial intensity distribution in a direction parallel to the beam advance direction of the femtosecond laser light has a shape of a substantially perfect circle at a focal spot inside a transparent material, wherein the inside of said transparent material is processed by the operation at a focal spot of the laser light focused inside said transparent material by said condenser lens.

8. The method according to claim 7, wherein a diffraction effect occurs with respect to a long direction of the approximately rectangularly shaped slit.

9. A device for processing the inside of a transparent material, comprising:

a femtosecond laser that emits laser light;

beam shape shaping means that includes a slit having a cross shape through which the laser light emitted from said femtosecond laser passes and shapes the beam shape of a cross-section in a direction orthogonal to the beam advance direction of the laser light emitted from said femtosecond laser into a cross shape; and a lens into which the laser light, where the beam shape of the cross-section in the direction orthogonal to said advance direction is shaped in the cross shape by said beam shape shaping means, enters and which focuses the laser light inside a transparent material, wherein the inside of said transparent material is processed by the operation of the laser light focused inside said transparent material by said lens.

10. The device according to claim 9, wherein a diffraction effect occurs with respect to a long direction of the approximately cross shaped slit so that a spatial intensity distribution in a direction parallel with the beam advance direction of the laser at the focusing point becomes closer to completely round.

11. A device for processing the inside of a transparent material, comprising:
- a femtosecond laser that emits laser light;
- beam shape shaping means for sequentially arranging a first cylindrical lens having the focal distance of f1 and a second cylindrical lens having the focal distance of f2 so as to be orthogonal to a beam advance direction of a femtosecond laser light emitted from said femtosecond laser and extending in parallel with each other and in a same direction, by setting a distance between said first cylindrical lens and said second cylindrical lens to "f1+f2", and shaping the beam shape of a cross-section in a direction orthogonal to the beam advance direction of the laser light emitted from said femtosecond laser into an approximately rectangular shape; and
- a condenser lens into which the laser light, where the beam shape of the cross-section in the direction orthogonal to said advance direction is shaped in the approximately rectangular shape by said beam shape shaping means, enters and which focuses the laser light so that a spatial intensity distribution in a direction parallel to the beam advance direction of the femtosecond laser light has a shape of a substantially perfect circle at a focal spot inside a transparent material, wherein
- the inside of said transparent material is processed by the operation at a focal spot of the laser light focused inside said transparent material by said condenser lens.

12. The device according to claim 11, wherein a diffraction effect occurs with respect to a long direction of the approximately rectangularly shaped slit.

13. The device for processing the inside of a transparent material according to any one of claim 7, claim 9 and claim 11, further comprising:
- moving means for moving the focal spot of the laser light focused inside said transparent material relatively with respect to said transparent material.

* * * * *